March 17, 1925.  1,530,278

E. G. MINNEMAN

CULINARY UTENSIL

Filed Oct. 15, 1924

Inventor:

Edward G. Minneman,

By Robert W. Randle,

Attorney.

Patented Mar. 17, 1925.

1,530,278

UNITED STATES PATENT OFFICE.

EDWARD G. MINNEMAN, OF RICHMOND, INDIANA.

CULINARY UTENSIL.

Application filed October 15, 1924. Serial No. 743,824.

*To all whom it may concern:*

Be it known that I, EDWARD G. MINNEMAN, a citizen of the United States, residing in the city of Richmond, in the county of Wayne, State of Indiana, have invented a new and useful Culinary Utensil, of which the following is a full, clear, and comprehensive specification and exposition, the same being such as will enable others to make and use the same with exactitude.

The object of my invention, broadly speaking, is to provide a culinary utensil or tool which is strong and durable in construction, easily operated and controlled, positive in action, and which can be manufactured and sold at a comparatively low price.

More particularly stated, my object is to provide a tool which is especially intended for use in making pies or other pastry, the same being adapted for trimming around the edges of pies and for crimping or decorating such edges and for pressing together the two edges of the pie dough, for decorating the layers of dough, and with means for lifting the edges of the dough, and for various other purposes in pastry work.

Other objects and particular advantages of the invention will suggest themselves in the course of the following description.

Figure 1:
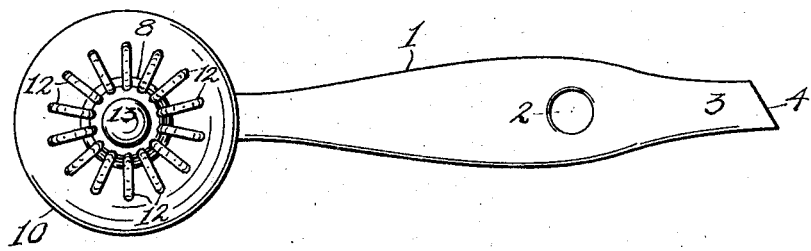
Figure 2:
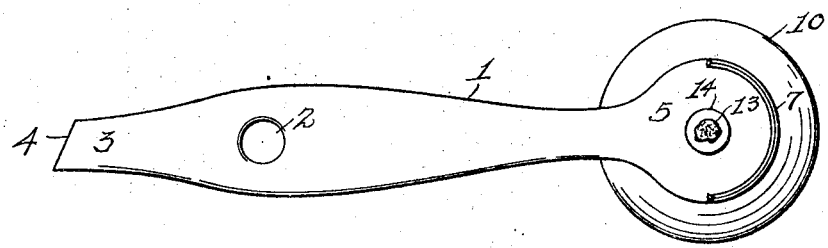
Figure 3:
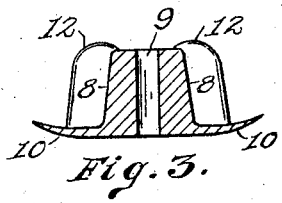
Figure 4:
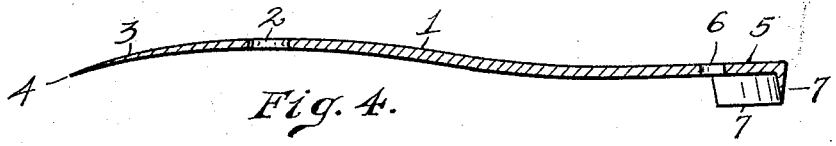

The preferred means for carrying out my invention in a practical and efficient manner is shown in the accompanying drawings, in which—Figure 1 is an inside or face view of the utensil complete. Figure 2 is a view of the back of the complete utensil. Figure 3 is a vertical central section of the roller or head. And Figure 4 is a longitudinal section of the body or handle.

Similar reference characters denote like parts throughout the several views of the drawings.

Referring now to the drawings in detail: Numeral 1 denotes the handle or body, formed substantially as shown, and having an aperture 2 therethrough by which the device may be hung upon a nail or hook. The outer end of the body 1 merges into a blade 3, which is reduced in width and it has a sharpened cutting edge 4 at its outer end, which edge is at an angle to the longitudinal axis of the body 1. Extending from the other end of the body 1 is a disc portion 5, having a central aperture 6 therethrough.

Extending up, or back, from the outer half of the periphery of the disc 5 is a crescent or half-round cutter 7 which extends at substantially right-angles to the disc 5 with which it is integral and its curvature is concentric with the aperture 6.

The head or revolvable portion of the device comprises a conical hub 8 having a central aperture 9 therethrough. Extending outward from around the larger end of the hub 8, and at right angles thereto, is a round cutter 10, which is of considerable larger diameter than is the disc 5. The peripheral portion of the cutter 10 curves slightly upward, that is in the direction of the smaller end of the hub 8, and its edge is formed sharp to afford cutting purposes.

Extending out radially from around the periphery of the hub 8 is a plurality of fins 12. Said fins are spaced an equal distance apart, their inner ends being integral with the cutter 10, and their outer ends extend beyond the small end of the hub 8, and these ends are rounded as shown. The edges of said fins are formed rounding, as they are not intended for cutting purposes.

The larger end of the hub 8 and a portion of the inner face of the cutter 10 is adapted to contact with the face of the disc 5, on the side of the latter opposite from the cutter 7, where said disc is revolvably secured by the rivet or bolt 13, there being a washer 14 through which the end of the rivet 13 passes, said washer being in contact with the outer face of the disc 5.

In practice the dough is first rolled out to the desired thickness, the edge of the blade 3 being used to run under the dough to release it from the board and so that it may be easily picked up by hand. Then after the lower crust dough has been placed in the pan, the second crust dough may be cut at various points by means of the cutting edge 4, also the cutter 7 may be employed for a like purpose, or both may be employed for giving artistic effect and to provide means for the escape of steam from the interior of the pie when it is being baked.

After both the bottom and the top crust dough has been placed in position then the device is taken by the handle and run around with the inner face of the cutter 10 in shearing contact with the edge of the pie-pan, and the fins at the same time will revolve in contact with the dough on top of the rim of the pie-pan. As the device travels forward the surplus dough is cut away, and the edge of the pie is crimped at the same time, thereby pressing the two layers of dough together and interlocking them so that the pie will not leak at its edges when being baked.

By means of the crescent cutter 7, the cutting edge 4, and the rounded outer ends of the fins 12, it will be seen that a great variety of decorative effects may be given to the top crust dough before it is placed in its final position.

I desire that it be understood that various changes may be made in the several details of construction from that herein shown, without departing from the spirit of the invention and without sacrificing any of the advantages thereof which are new.

Having now fully shown and described my invention, what I claim, and desire to secure by Letters Patent of the United States, is—

A culinary utensil, comprising a handle forming a blade with a disc formed on the opposite end of the handle from the blade with a portion of the periphery of said disc turned at right angles to the disc and with an aperture formed through the center of the disc, a solid hub of conical shape with a central aperture therethrough, a cutting disc extending out from around the larger end of said hub and integral therewith, a plurality of fins radiating from the periphery of the hub with their inner ends integral with the cutting disc and with their outer rounded ends extending beyond the smaller end of the hub, and a rivet extending through the apertures in the hub and the first mentioned disc whereby the two discs are in contact with each other with the cutting disc adapted to revolve with relation to the handle proper.

In testimony whereof I have hereunto subscribed my name to this specification.

EDWARD G. MINNEMAN.